(12) United States Patent
Zhou

(10) Patent No.: US 8,248,003 B2
(45) Date of Patent: Aug. 21, 2012

(54) VIBRATION FREQUENCY ADJUSTING SYSTEM AND METHOD

(75) Inventor: Ying Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 382 days.

(21) Appl. No.: 12/693,515

(22) Filed: Jan. 26, 2010

(65) Prior Publication Data

US 2011/0148330 A1    Jun. 23, 2011

(30) Foreign Application Priority Data

Dec. 18, 2009   (CN) .......................... 2009 1 0311807

(51) Int. Cl.
*H02K 33/00* (2006.01)

(52) U.S. Cl. ........ 318/114; 320/107; 320/127; 320/128; 340/384.1; 340/384.7; 340/392.2; 340/393.2; 340/566; 340/567; 340/522; 340/561

(58) Field of Classification Search .................. 318/114; 320/107, 127, 128; 340/384.1, 384.7, 392.2, 340/393.2, 566, 567, 522, 561
See application file for complete search history.

(56) References Cited

U.S. PATENT DOCUMENTS

| | | | | |
|---|---|---|---|---|
| 5,436,622 | A * | 7/1995 | Gutman et al. ................. 340/7.6 |
| 6,774,769 | B2 * | 8/2004 | Okada ......................... 340/407.1 |
| 7,019,622 | B2 * | 3/2006 | Orr et al. ..................... 340/407.1 |
| 8,084,968 | B2 * | 12/2011 | Murray et al. ................. 318/114 |
| 2003/0162571 | A1 * | 8/2003 | Chung ........................... 455/567 |
| 2005/0093302 | A1 * | 5/2005 | Miyazaki et al. ............. 290/1 R |
| 2009/0200983 | A1 * | 8/2009 | Dyer et al. .................... 320/107 |

* cited by examiner

*Primary Examiner* — Rita Leykin
(74) *Attorney, Agent, or Firm* — Altis Law Group, Inc.

(57) ABSTRACT

A vibration frequency adjusting system and method measures energy of a vibration generated by a vibrator of an electronic device, and converts the vibration energy to a level of electric charge. The system and method further compares the level of electric charge with preset electric charge thresholds, and adjusts the level of electric charge to a preset level of electric charge according to the comparison. Then, the system and method converts the adjusted preset level of electric charge to a voltage, and outputs the voltage to vibrator, so as to adjust the frequency of the vibration according to the voltage.

15 Claims, 3 Drawing Sheets

VIBRATION FREQUENCY ADJUSTING SYSTEM AND METHOD

BACKGROUND

1. Technical Field

Embodiments of the present disclosure relates to mobile devices, and more particularly, to a vibration frequency adjusting system and a method applied in an electronic device.

2. Description of Related Art

Vibration functions of electronic devices, such as mobile phones, are frequently used by users. However, at present, the mobile phones often provide default vibration frequencies. For example, a mobile phone may only provide one vibration frequency, or two or more available vibration frequencies for a user to select one. Once a vibration frequency is selected, the vibration frequency is independent of whether the mobile phone is in a static state or a vibration state. As a result, with the same selected vibration frequency, the user may sometimes feel the vibration of the mobile phone is too wild, such as when the mobile phone is put on a static desk in a quiet class room. In another example, the user may sometimes not feel the vibration of the mobile phone, such as when the mobile phone is placed in a bag and the user is on a noisy and jolty bus.

What is needed, therefore, is an improved method to overcome the aforementioned problem.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
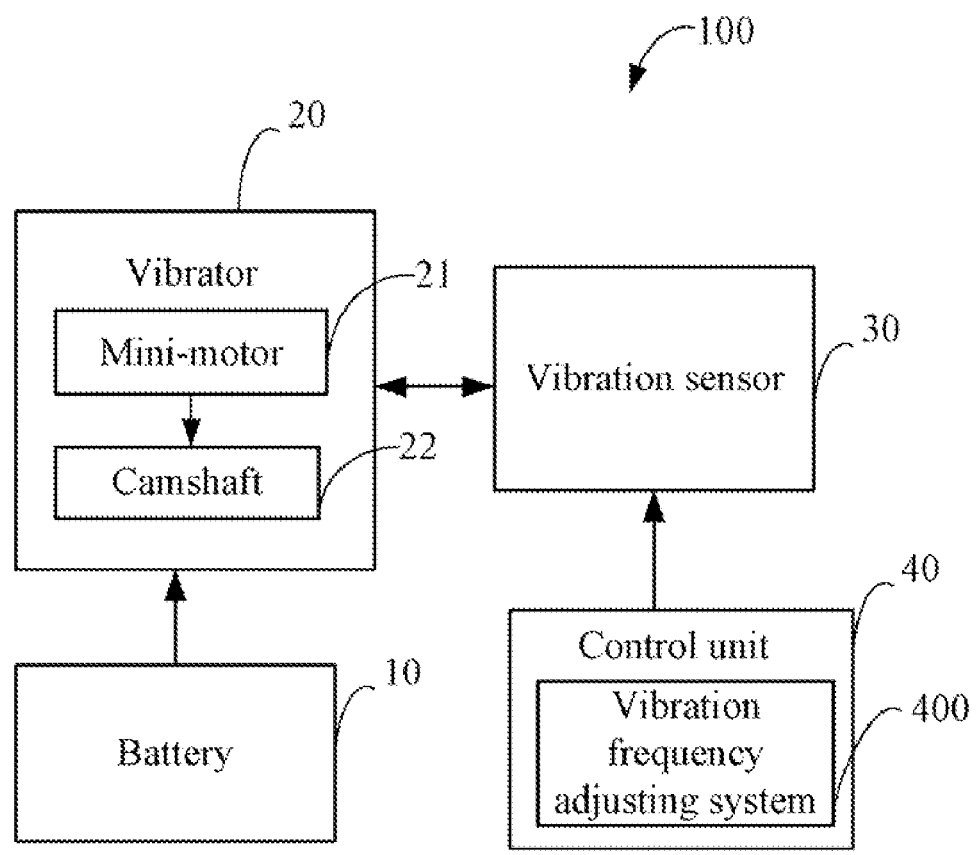
FIG. 1 is a block diagram of one embodiment of a block diagram of an electronic device comprising a vibration frequency adjusting system.

FIG. 1 is a block diagram of one embodiment of an electronic device 100. In one embodiment, the electronic device 100 includes a battery 10, a vibrator 20, a vibration sensor 30, and a control unit 40. The vibrator 20 includes a mini-motor 21 and a camshaft 22. The battery 10 supplies power to the mini-motor 21, so that the mini-motor 21 drives the camshaft 22 to rotate, to induce a vibration of the electronic device 100. Depending on the embodiment, the electronic device 100 may be a mobile phone, a personal digital assistant, or any other suitable device. The battery 10 may be a nickel-cadmium battery, a nickel-metal hydride battery, or a lithium ion battery, for example.

The vibration sensor 30 measures energy and a frequency of the vibration generated by the vibrator 20. The vibration sensor 30 further converts the measured vibration energy to a level of electric charge according to mechanism and electricity conversion principles, and transmits the level information of the electric charge to the control unit 40. Depending on the embodiment, the vibration sensor 30 may be an inductive sensor, a capacitive sensor, or a resistant sensor.

In one embodiment, the control unit 40 includes a vibration frequency adjusting system 400. The vibration frequency adjusting system 400 compares the level of electric charge with preset electric charge thresholds, and adjusts the level of electric charge to a preset level of electric charge according to the comparison result. The vibration sensor 30 further converts the preset level of electric charge to a voltage, and outputs the converted voltage to the vibrator 20. Then, the vibrator 20 adjusts the vibration frequency according to the converted voltage.

Figure 2:
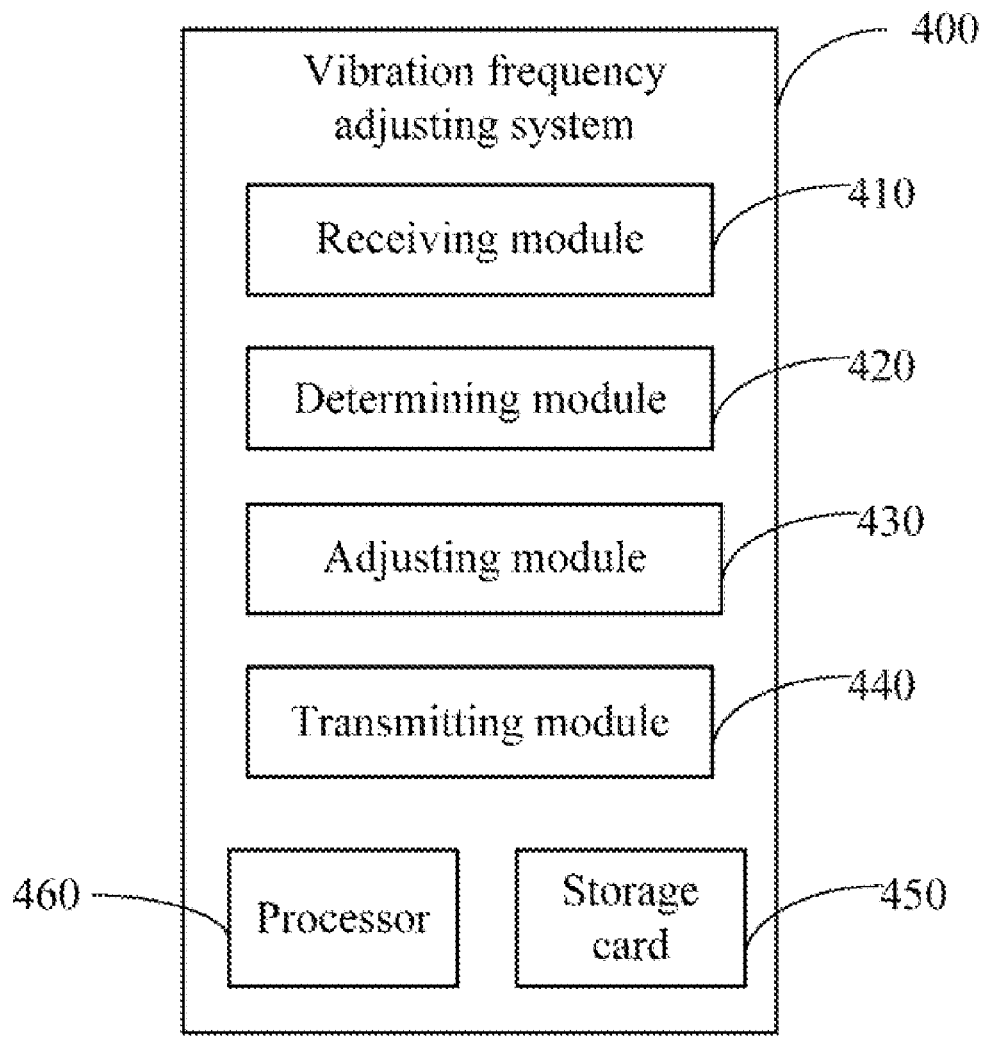
FIG. 2 is a block diagram of one embodiment of function modules of the vibration frequency adjusting system in FIG. 1.

In one embodiment, as shown in FIG. 2, the vibration frequency adjusting system 400 includes a receiving module 410, a determining module 420, an adjusting module 430, and a transmitting module 440. One or more computerized codes of the modules 410-440 are stored in a storage card 450 of the vibration frequency adjusting system 400, where a processor 460 executes the computerized codes to provide one or more operations of the vibration frequency adjusting system 400. Depending on the embodiment, the storage card 450 may be a smart media card, a secure digital card, or a compact flash card.

The receiving module 410 receives the level of the electric charge (e.g., a value B) that has been converted from the vibration energy as measured by the vibration sensor 20. It is understood that the higher the measured vibration energy, the higher of the electric charge. For example, supposing the camshaft 22 rotates 10000 revolutions per minute (RPM) to induce a vibration with a frequency of 160 Hz, with the same vibration frequency, the vibration energy measured by the vibration sensor 20 may be different if the electronic device 100 is in different states. For example, if the electronic device 100 is put on a non-moving surface (e.g., a desk), which produces less reacting force to the vibration, the vibration sensor 20 may measure higher vibration energy, so that the level of converted electric charge may be more (e.g., B=0.35 coulombs). If the electronic device 100 is on a moving object (e.g., a car), the vibration may bear stronger reacting force so that the vibration sensor 20 may measure lower vibration energy. As a result, the level of converted electric charge may be less (e.g., B=0.20 coulombs).

The determining module 420 compares the level of electric charge B with the preset electric charge thresholds. In this embodiment, the preset electric charge thresholds may be two, a preset higher electric charge threshold T1 and a preset lower electric charge threshold T2. For example, the preset higher electric charge threshold T1 may be 0.33 coulombs, and the preset lower electric charge threshold T2 may be 0.24 coulombs. The determining module 420 further determines if the level of the electric charge falls in a range between the preset lower electric charge threshold T1 and the preset higher electric charge threshold T2, such as [0.24, 0.33].

The adjusting module 430 adjusts the level of electric charge B to the preset level of electric charge according to the comparison result. In one embodiment, the preset level of electric charge may include two preset values, such as a first preset level of electric charge B1=0.3 coulombs and a second preset level of electric charge B2=0.4 coulombs. If the level of electric charge B (e.g., B=0.35 coulombs) is more than the preset higher electric charge threshold T1 (e.g., T1=0.33 coulombs), the adjusting module 430 adjusts the level of electric charge B to the first preset level of electric charge B1=0.3 coulombs. If the level of electric charge B (e.g., B=0.20 coulombs) is less than the preset lower electric charge threshold T2 (e.g., T2=0.24 coulombs), the adjusting module 430 adjusts the level of electric charge B to the second preset level of electric charge B2=0.4 coulombs.

The transmitting module 440 informs the vibration sensor 30 of the adjusted preset level of electric charge. Then the vibration sensor 30 converts the adjusted preset level of electric charge to a voltage, and outputs the converted voltage to the vibrator 20. For example, the vibration sensor 30 may convert the first preset level of electric charge B1=0.3 coulombs to the voltage of 2.7 volts, or may convert the second preset level of electric charge B2=0.4 coulombs to the voltage of 3.6 volts.

The vibrator 20 adjusts the vibration frequency according to the input voltage. For example, if the input voltage is 2.7 volts, the mini-motor 21 may adjust the rotation speed of the camshaft 2 from 10000 RPM to 9000 RPM, so as to adjust the vibration frequency from 160 Hz to 150 Hz. If the input voltage is 3.6 volts, the mini-motor 21 may adjust the rotation speed of the camshaft 2 from 10000 RPM to 12000 RPM, so as to adjust the vibration frequency from 160 Hz to 180 Hz.

Figure 3:
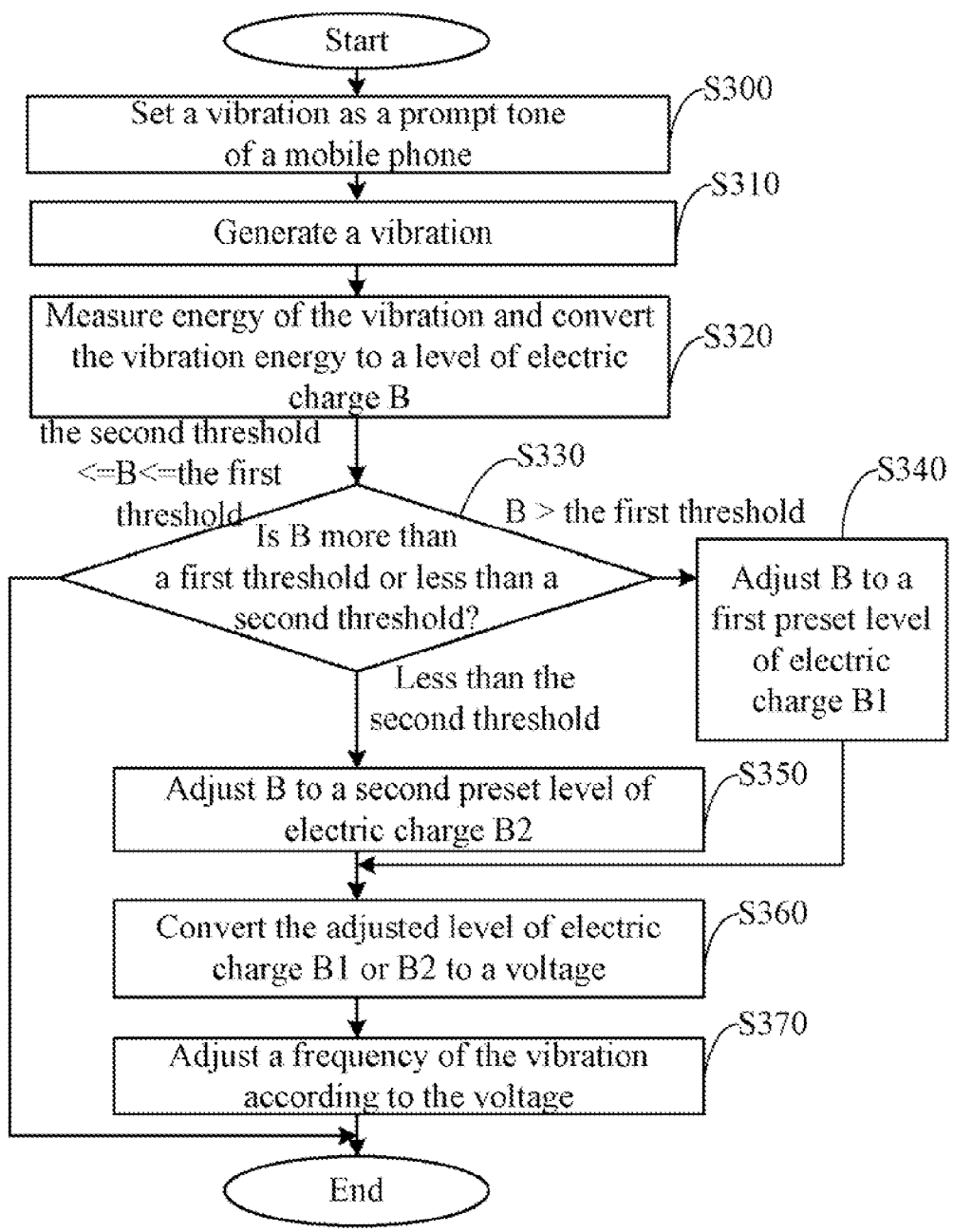
FIG. 3 is a flowchart of one embodiment of a method for adjusting a vibration frequency of the electronic device in FIG. 1.

FIG. 3 is a flowchart of one embodiment of a method for adjusting a vibration frequency of the electronic device 100 in FIG. 1. Depending on the embodiment, additional blocks may be added, others removed, and the ordering of the blocks may be changed.

In block S300, the electronic device 100 may be in a vibration mode. The vibration mode may be set according to different situations for receiving incoming calls or messages.

In block S310, the vibrator 20 generates a vibration in response that the electronic device 100 receives an incoming call or an message. For example, the mini-motor 21 of the vibrator 20 may drive the camshaft 22 to rotate to generate the vibration with a frequency of 160 Hz.

In block S320, the vibration sensor 30 measures energy of the vibration, and converts the measured vibration energy to a level of electric charge. As mentioned above, due to different acting forces bared by the electronic device 100 in different states, with the same vibration frequency, the measured vibration energy may be different, so that the level of converted electric charge B may be different. For example, with the vibration frequency of 160 Hz, the level of converted electric charge B may be 0.35 coulombs if the electric device is put on a static desk, and the level of converted electric charge B may be 0.20 coulombs if the electronic device 100 is put in a jolty bag.

In block S330, the receiving module 410 receives the amount information of the converted electric charges, the determining module 420 determines if the level of converted electric charge B is more than a preset higher electric charge threshold (e.g., T1=0.33 coulombs), or less than a preset lower electric charge threshold (e.g., T2=0.24 coulombs). If the level of converted electric charge B is more than a preset higher electric charge threshold (such as 0.35 coulombs>0.33 coulombs), the procedure goes to block S340, the adjusting module 430 adjusts the level of converted electric charge B to a first preset level of electric charge B1. For example, the adjusting module 430 adjusts the level of converted electric charge B=0.35 coulombs to the first preset level of electric charge B1=0.3 coulombs.

In block S330, if the determining module 420 determines that the amount of the converted electric charge B is less than the preset lower electric charge threshold (such as 0.20 coulombs<0.24 coulombs), the procedure goes to block S350, the adjusting module 430 adjusts the level of converted electric charge B to a second preset level of electric charge B2. For example, the adjusting module 430 adjusts the level of converted electric charge B=0.20 coulombs to the second preset level of electric charge B2=0.4 coulombs.

Otherwise, In block 5330, if the determining module 420 determines that the level of converted electric charge B (e.g., B=0.30 coulombs) is more than or equal to the preset lower electric charge threshold (e.g., T2=0.24 coulombs) and less than or equal to the preset higher electric charge threshold (e.g., T1=0.33 coulombs), the procedure ends.

In block 5360, the transmitting module 440 informs the vibration sensor 30 of the adjusted preset level of electric charge (such as B1=0.3 coulombs or B2=0.4 coulombs). Then, the vibration sensor 30 converts the adjusted preset level of electric charge to a voltage, and outputs the converted voltage to the vibrator 20. For example, the vibration sensor 30 may convert the first preset level of electric charge B1=0.3 coulombs to a voltage of 2.7 volts, or may convert the second preset level of electric charge B2=0.4 coulombs to a voltage of 3.6 volts.

In block 5370, the vibrator 20 adjusts the vibration frequency according to the input voltage. For example, if the input voltage is 2.7 volts, the vibration frequency may be adjusted from 160 Hz to 150 Hz. If the input voltage is 3.6 volts, the vibration frequency may be adjusted from 160 Hz to 180 Hz.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A vibration frequency adjusting method for an electronic device, the method comprising:
    generating a vibration by a vibrator of the electronic device in response to receive an incoming call or a message by the electronic device;
    measuring energy of the vibration and converting the measured vibration energy into electric charge by a vibration sensor connected to the vibrator;
    comparing a level of the electric charge with preset electric charge thresholds;
    adjusting the level of electric charge to a preset level of electric charge according to the comparison; and
    informing the vibration sensor to convert the adjusted preset level of electric charge to a voltage and output the voltage to the vibrator, so as to adjust a frequency of the vibration according to the voltage.

2. The method as claimed in claim 1, wherein:
    the preset electric charge thresholds comprise a first preset electric charge threshold and a second preset electric charge threshold, the first preset electric charge threshold being more than the second preset electric charge threshold; and
    the preset level of electric charge comprise a first preset level of electric charge and a second preset level of electric charge.

3. The method as claimed in claim 2, wherein the comparison comprises the level of electric charge being more than the first preset electric charge threshold, the level of electric charge being less than the second preset electric charge threshold, and the level of electric charge being equal to or more than the second preset electric charge threshold and equal or less than the first preset electric charge threshold.

4. The method as claimed in claim 3, wherein if the comparison is that the level of electric charge is more than the first preset electric charge threshold, the level of electric charge is adjusted to the first preset level of electric charge.

5. The method as claimed in claim 3, wherein if the comparison is that the level of electric charge is less than the second preset electric charge threshold, the level of electric charge is adjusted to the second preset level of electric charge.

6. The method as claimed in claim 1, wherein the vibrator comprises a mini-motor and a camshaft, and the mini-motor adjusts a rotation speed of the camshaft according to the voltage output from the vibration sensor, so as to adjust the frequency of the vibration.

7. A vibration frequency adjusting system applied in an electronic device, the electronic device comprising a vibrator to generate a vibration, a vibration sensor connected to the vibrator to measure the vibration energy and convert the measured vibration energy to a level of electric charge, the system comprising:
  a storage card;
  at least one processor; and
  one or more programs stored in the storage card to be executed by the at least one processor, the one or more programs comprising:
    a receiving module operable to receive the level of electric charge from the vibration sensor;
    a determining module operable to compare the level of electric charge with preset electric charge thresholds, and determine if the level of electric charge needs to be adjusted according to the comparison;
    an adjusting module operable to adjust the level of electric charge to a preset level of electric charge according to the comparison; and
    an transmitting module operable to inform the vibration sensor to convert the adjusted preset level of electric charge to a voltage and output the voltage to the vibrator, so as to adjust a frequency of the vibration according to the voltage.

8. The system as claimed in claim 7, wherein:
  the preset electric charge thresholds comprise a first preset electric charge threshold and a second preset electric charge threshold, the first preset electric charge threshold being more than the second preset electric charge threshold; and
  the preset level of electric charge comprise a first preset level of electric charge and a second preset level of electric charge.

9. The system as claimed in claim 8, wherein the comparison comprises the level of electric charge being more than the first preset electric charge threshold, the level of electric charge being less than the second preset electric charge threshold, and the level of electric charge being equal to or more than the second preset electric charge threshold and equal or less than the first preset electric charge threshold.

10. The system as claimed in claim 9, wherein if the comparison is that the level of electric charge is more than the first preset electric charge threshold, the adjusting module subtracts the level of the electric charge to obtain the first preset level of electric charge.

11. The system as claimed in claim 9, wherein if the comparison is that the level of electric charge is less than the second preset electric charge threshold, the adjusting module increases the level of the electric charge to obtain the second preset level of electric charge.

12. The system as claimed in claim 9, wherein if the comparison is that the level of electric charge is equal to or more than the second preset electric charge threshold and equal or less than the first preset electric charge threshold, the adjusting module does not adjust the level of electric charge.

13. The system as claimed in claim 7, wherein the vibrator comprises a mini-motor and a camshaft, and the mini-motor adjusts a rotation speed of the camshaft according to the voltage output from the vibration sensor, so as to adjust the frequency of the vibration.

14. The system as claimed in claim 7, wherein the storage card is selected from the group consisting of a smart media card, a secure digital card, and a compact flash card.

15. The system as claimed in claim 7, wherein the electronic device is a mobile phone or a personal digital assistant.

* * * * *